United States Patent
Breneman et al.

(10) Patent No.: US 9,206,368 B2
(45) Date of Patent: Dec. 8, 2015

(54) SYSTEM AND PROCESS FOR PRODUCING TORREFIED BIOMASS USING A MASS FLOW REACTOR

(75) Inventors: William C. Breneman, Moses Lake, WA (US); David Carter, Brush Prairie, WA (US); Hiroshi Morihara, Gresham, OR (US); Andrew Green, Salem, OR (US)

(73) Assignee: HM3 Energy, Inc., Gresham, OR (US)

( * ) Notice: Subject to any disclaimer, the term of this patent is extended or adjusted under 35 U.S.C. 154(b) by 744 days.

(21) Appl. No.: 13/449,735

(22) Filed: Apr. 18, 2012

(65) Prior Publication Data

US 2012/0261245 A1      Oct. 18, 2012

Related U.S. Application Data

(60) Provisional application No. 61/476,665, filed on Apr. 18, 2011.

(51) Int. Cl.
| | |
|---|---|
| *C10B 49/02* | (2006.01) |
| *C10B 53/02* | (2006.01) |
| *C10L 9/08* | (2006.01) |
| *C10L 5/44* | (2006.01) |

(52) U.S. Cl.
CPC ............... *C10L 9/083* (2013.01); *C10B 49/02* (2013.01); *C10B 53/02* (2013.01); *C10L 5/44* (2013.01); *Y02E 50/10* (2013.01); *Y02E 50/14* (2013.01); *Y02E 50/15* (2013.01); *Y02E 50/30* (2013.01)

(58) Field of Classification Search
CPC ........... C10B 49/02; C10B 53/02; C10L 5/44; C10L 9/083; Y02E 50/10; Y02E 50/14; Y02E 50/15; Y02E 50/30
USPC .................... 201/1, 20, 37; 202/99
See application file for complete search history.

(56) References Cited

U.S. PATENT DOCUMENTS

| | | | | |
|---|---|---|---|---|
| 3,018,227 | A * | 1/1962 | Baum et al. | 44/568 |
| 4,007,093 | A * | 2/1977 | Doilov et al. | 202/121 |
| 5,584,970 | A * | 12/1996 | Schmalfeld et al. | 201/27 |
| 2010/0101141 | A1 | 4/2010 | Shulenberger et al. | |
| 2010/0242351 | A1 | 9/2010 | Causer | |
| 2010/0258429 | A1 | 10/2010 | Ugolin | |
| 2011/0116986 | A1* | 5/2011 | Balint et al. | 422/198 |
| 2012/0023813 | A1 | 2/2012 | Sethi et al. | |
| 2012/0073159 | A1 | 3/2012 | Weisselberg et al. | |
| 2012/0085023 | A1 | 4/2012 | Teal et al. | |

FOREIGN PATENT DOCUMENTS

| | | |
|---|---|---|
| DE | 10 2010 045 612 | 3/2012 |
| WO | WO 2011/135305 | 11/2011 |

OTHER PUBLICATIONS

International Search Report dated Jul. 17, 2012 from International Application No. PCT/US2012/034076.

* cited by examiner

*Primary Examiner* — Renee E Robinson
*Assistant Examiner* — Jonathan Miller
(74) *Attorney, Agent, or Firm* — Klarquist Sparkman, LLP

(57) ABSTRACT

A system and method are described for torrefaction of particulate biomass. The system comprises a reactor having mass flow characteristics, containing particulate biomass, and further is equipped with a heated gas input; a gas discharge output; a particulate solids inlet; and a particulate solids discharge.

14 Claims, 3 Drawing Sheets

SYSTEM AND PROCESS FOR PRODUCING TORREFIED BIOMASS USING A MASS FLOW REACTOR

CROSS REFERENCE TO RELATED APPLICATION

This application claims the benefit of the earlier filing date of U.S. Provisional Application No. 61/476,665, filed Apr. 18, 2011, which is incorporated herein by reference in its entirety.

FIELD

A system and process is described for production of torrefied biomass using a mass flow reactor.

BACKGROUND

Reactors for torrefaction of biomass have been proposed in a variety of configurations. Most include some type of machinery which moves or manipulates the biomass so as to expose the mass to a flowing stream of hot gases. Such devices have been identified in US 2012/0085023, which describes a rotating drum heated by an internal gas stream. DE 102010045612 describes a horizontal cylinder with an internal conveyor with external heating. WO2011135305 describes a reactor wherein hot gases are injected at high velocity into a toroidal bed of biomass, and US 20120073159 describes a modified tray drier with internal circulation of hot gases to conduct the torrefaction of biomass. All of these devices require a mechanical device of some significant horsepower to move either the biomass or the hot gases. While all of the processes are conducted at near atmospheric pressure, there is a slight positive pressure and thus the potential for leakage exists of the torrefaction gases, especially at rotating shafts and external duct work. In addition, the scale-up of these devices is limited by the long residence time required to conduct the torrefaction reaction. The manifestation of these issues results in process equipments which are quite large; require large horsepower motors to move the biomass and/or the hot gases; and which contribute to an overall undue complexity. Accordingly there is a need to present a torrefaction system which mitigates these issues.

SUMMARY

A first disclosed embodiment concerns a system for torrefaction of particulate biomass comprising a reactor having mass flow characteristics, containing particulate biomass. The system further is equipped with a heated gas input; a gas discharge output; a particulate solids inlet or inlet means; and a particulate solids discharge or discharge means. In a further aspect, this disclosure relates to a process for the production of torrefied biomass by subjecting a raw particulate biomass to an elevated temperature sufficient to bring about torrefaction of the biomass. One disclosed embodiment of the process comprises introducing particulate biomass into a torrefaction reactor having mass flow characteristics and further is equipped with a heated gas input; a gas discharge output; a particulate solids inlet or inlet means; and a particulate solids discharge or discharge means.

The advantages of this invention are functional construction of the reactor to achieve a uniform flow and residence time of the biomass without recourse to mechanical flow aids and moving parts, a low pressure drop for the hot torrefaction gases, which translates to low energy requirements and adequate control of the overall torrefaction reaction by modulating the gas temperature and mass flow rate to achieve the desired extent of reaction.

The foregoing and other objects, features, and advantages of the invention will become more apparent from the following detailed description, which proceeds with reference to the accompanying figures.

DETAILED DESCRIPTION

The torrefaction system disclosed herein is characterized by use of a torrefaction reactor that has mass flow characteristics. Mass flow characteristics means the particulate contents of the reactor are able to pass through the reactor in a uniform manner without stagnant regions or regions which provide for short circuiting. The characteristics of mass flow bins and hoppers as storage equipment are known to a person of ordinary skill in the art. However, bulk flow hopper style reactors apparently have not been previously considered for use in a torrefaction system. The main detractor has been the highly variable nature of the feed stock and the requirements for a successful bulk flow reactor design. Bulk flow bins or hoppers are so named because there is little back-mixing or hold-up of the processed material, as well as little or no by-passing or short-circuiting of material as it flows down through the unit. Without relying upon internal moving parts, mass flow hoppers or bins provide a uniform residence time for all of the material flowing down through the unit and provide for a uniformly processed product. However, the design of a hopper to achieve mass-flow conditions requires knowledge of the flow characteristics of the granular solid. If the flow properties of the material are not well known or controlled within the operational design parameters of a mass flow design, the uniform flow requirement will not be met and the quality of the product will not meet expectations. However, with a good definition of the flow properties of the material, standard formulas are available to define the critical dimensions for the hopper to achieve the desired mass flow characteristic.

Figure 1:
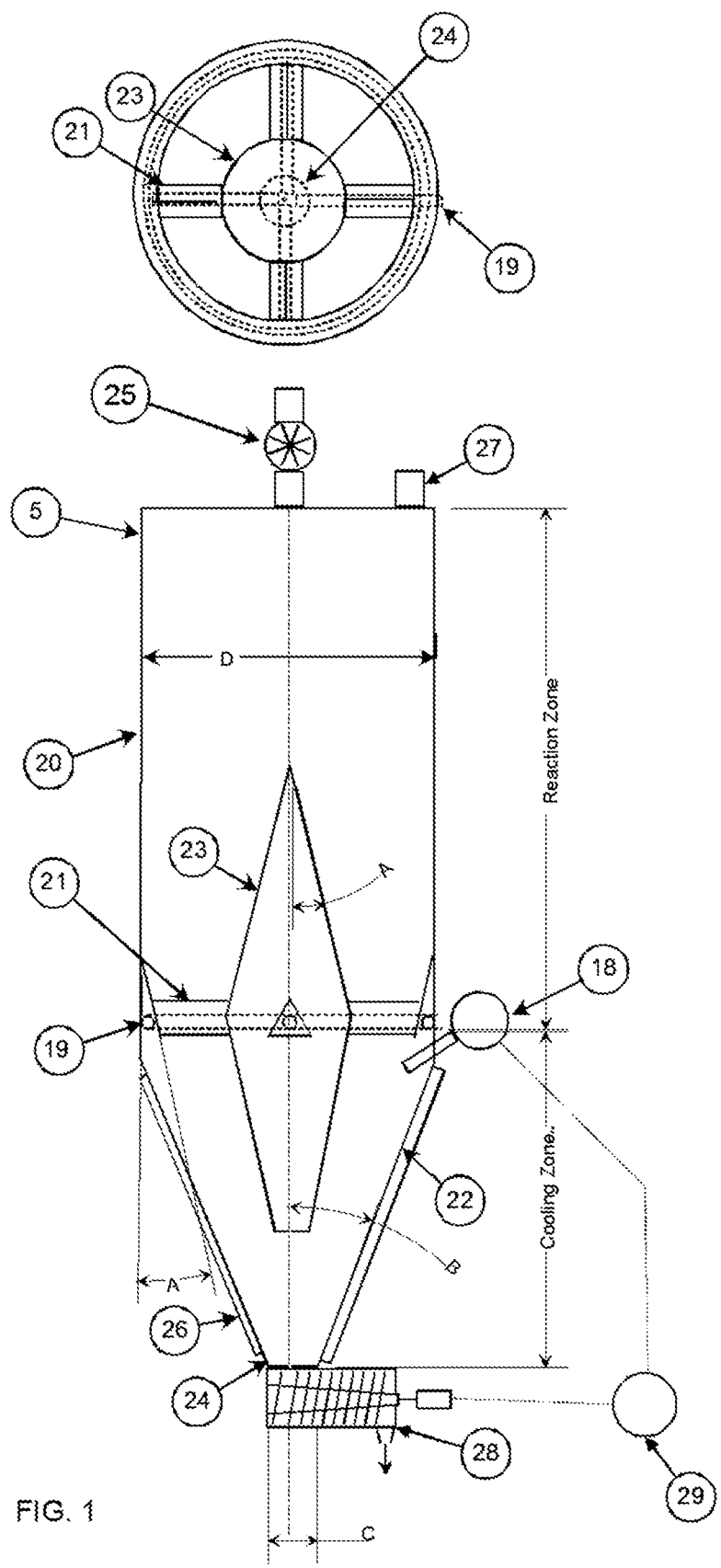
FIG. 1 is a schematic representation of a disclosed embodiment of a torrefaction reactor.
Figure 3:
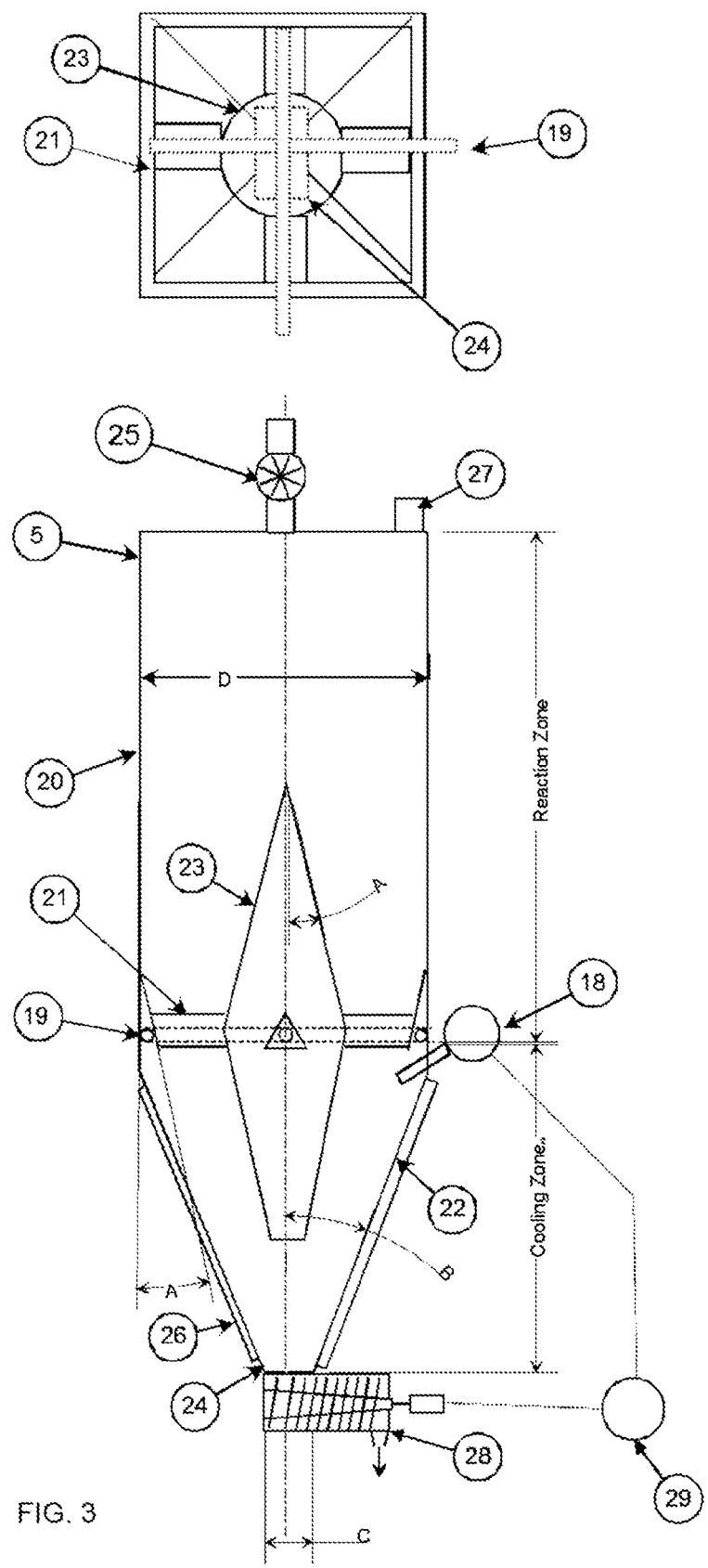
FIG. 3 is a schematic representation of a disclosed embodiment of a torrefaction reactor.

Certain embodiments of disclosed torrefaction reactors are schematically represented by FIG. 1 and FIG. 3 and can be described being configured as a vertical disposed cylindrical or rectangular vessel (5) having an upper straight walled section (20), defining a reaction chamber, and a lower tapered bottom section (22) defining a cooling zone. One particular reactor is configured as a cylindrical vessel for ease of construction and management. As noted above, the mass flow characteristics are conferred with knowledge of the flow properties of the material to be placed in the reactor, which in turn directs the geometry of the lower tapered bottom section of the reactor. For the purpose of the disclosed torrefaction reactor and system intended for treatment of particulate biomass, mass flow characteristics are obtained when the angle of the tapered section has an angle from the vertical of 25° or less, and advantageously is within the range of 10° to 25°, and more advantageously from 12° to 18°.

As noted above, one consideration for a suitable torrefaction system is the ability to control the residency time of the material within the reactor to achieve a satisfactory and uniform torrefaction of the processed material. Presently disclosed embodiments operate in a continuous mode, as opposed to batch mode. Accordingly, control of the flow of the material through the reactor is important to achieve the correct processing and conversion of the material. To this purpose, appropriate control of flow and residency time of particulate material within the reactor is achieved when the reactor is equipped with particulate discharge or discharge means comprising an opening typically ovoid or spherical, located at the base of the tapered bottom section, and having a dimension of at least 200 mm or more in the shortest cross-section.

The torrefaction of biomass generally involves applying heat to induce conversion of the raw biomass to torrefied biomass; such heat is provided by the introduction of hot gases into the torrefaction reactor. Accordingly, the reactor is provided with a heated gas input (19) positioned to be at the top of the tapered bottom section or bottom of the upper straight-walled section and comprises a device able to introduce the heated gas around the perimeter of the reactor; typically such device is one or more injectors, or a plenum having numerous orifice holes sized and spaced apart so as to assure even distribution of the hot torrefying gases while minimizing the system pressure drop. The region of the reactor between the hot gas inlet (19) and the gas outlet (27) is the torrefaction zone. The entry point of the hot gases into the mass flow torrefier reactor at a point (21) corresponds to where the stress on the biomass is higher than in the bulk of the reactor. That is, at a location where the cross sectional flow area of the mass flow reactor is becoming constrained, at the point where the straight sides of the reactor meet a conical shaped lower portion. The hot gases pass through the torrefaction zone contacting enroute any particulate biomass within the zone and exit from zone as torrefaction gases from the reactor, generally at the top of the reactor.

In operation, the particulate biomass enters the top of the mass flow reactor (25) and after descending the reactor in a mass flow mode, moving against the upward flow of hot gases, the torrefied biomass leaves the lower discharge point of the reactor (24). By suitable design of the sloped walls of the mass flow reactor, the entire mass remains in the torrefaction zone of the reactor for a uniform and controlled period of time. As noted above discharge of the torrefied biomass occurs via the particulate discharge means. To further facilitate control of the rate of discharge the system may be equipped with a discharge regulating device 28 located externally to the particulate discharge means and wherein the device 28 comprises a conveyor or airlock.

In a preferred embodiment, the system disclosed herein is further equipped with a temperature sensing means, or temperature sensor 29, able to determine the temperature of the particulate biomass within the reaction temperature. The temperature sensing means, or temperature sensor 29, is further in communication with the discharge regulating device 28 and together function to control the rate of discharge of torrefied particulate biomass from the system. In this manner, the residency time of the particulate biomass within the torrefaction reactor is controlled by function of its temperature, thereby ensuring a correct and desired degree of torrefaction. And by using a reactor having mass flow characteristics the uniformity of the degree of torrefaction is consistent across the bulk mass of the material.

Further discussion of the system by way of the process follows.

The term biomass is used here to denote various kinds of cellulose containing materials and in the context of this present work means, by way of example and without limitation, forest waste, agricultural crops either grown specifically for energy production or as by-products of traditional agricultural activities or cellulosic biomass from urban origin.

The general process for converting biomass to torrefied product is known. The biomass contains a substantial and highly variable amount of moisture, either as free water or bound water. The biomass is also generally highly variable in the physical size of the individual pieces. Based on these attributes, prior torrefaction systems are configured to specifically process feedstocks of wide variation in the physical size and shape as well as composition.

For successful torrefaction of biomass for use as a solid fuel replacement for coal in powdered coal fueled combustors, uniform and controlled torrefaction of biomass is required. Incomplete torrefaction results in a product which will be problematic in grinder operations due to a higher modulus (flexibility and toughness). Over-torrefied material loses more of its energy as the high fuel value compounds are driven off at long residence time or higher temperatures.

Biomass may be obtained from forest thinning operations, as non-commercial "slash" from commercial logging operations or from purposeful agricultural operations which encourage fast growing cellulosic species such as switch grass, corn stover, arundo donax. Defining characteristics of these materials are that they have a wide range of as-harvested physical size and shape and a highly variable amount of moisture. By setting conditions for the physical size of the biomass feed stock, a mass flow vessel design can be derived that will accommodate a reasonably allowable variation in feed stock attributes. Simple grinding and sizing methods can economically achieve a sufficiently uniform size for the feedstock that allows a bulk flow hopper to be designed. Furthermore, control of the torrefaction process is facilitated by separating the high energy and time dependent drying portion of the process from the high temperature, shorter residence time torrefaction portion of the process. This ability to separate these two process step facilitates a greater degree of control and hence production of a more consistent torrefied product.

The torrefaction process disclosed herein for producing torrefied biomass subjects raw particulate biomass to an elevated temperature sufficient to bring about torrefaction of the biomass and comprises introducing particulate biomass into a torrefaction reactor having mass flow characteristics and equipped with a heated gas input; a gas discharge output; a particulate solids inlet means, or particulate solid inlet; and a particulate solids discharge means, or particulate solid discharge. In certain embodiments, the gas discharge output is a perforated collection duct located within an upper straight walled section and positioned centrally to the vertical axis of the reaction chamber.

To enhance the efficiency of the use of a mass flow hopper as a torrefaction reactor which provides a uniform treatment of the biomass material, it is desirable to pretreat the raw particulate biomass prior to charging to the torrefaction reactor and mitigate some of the variance of the natural feed material. These pre-treatments are more fully described in the following discussion.

Figure 2:
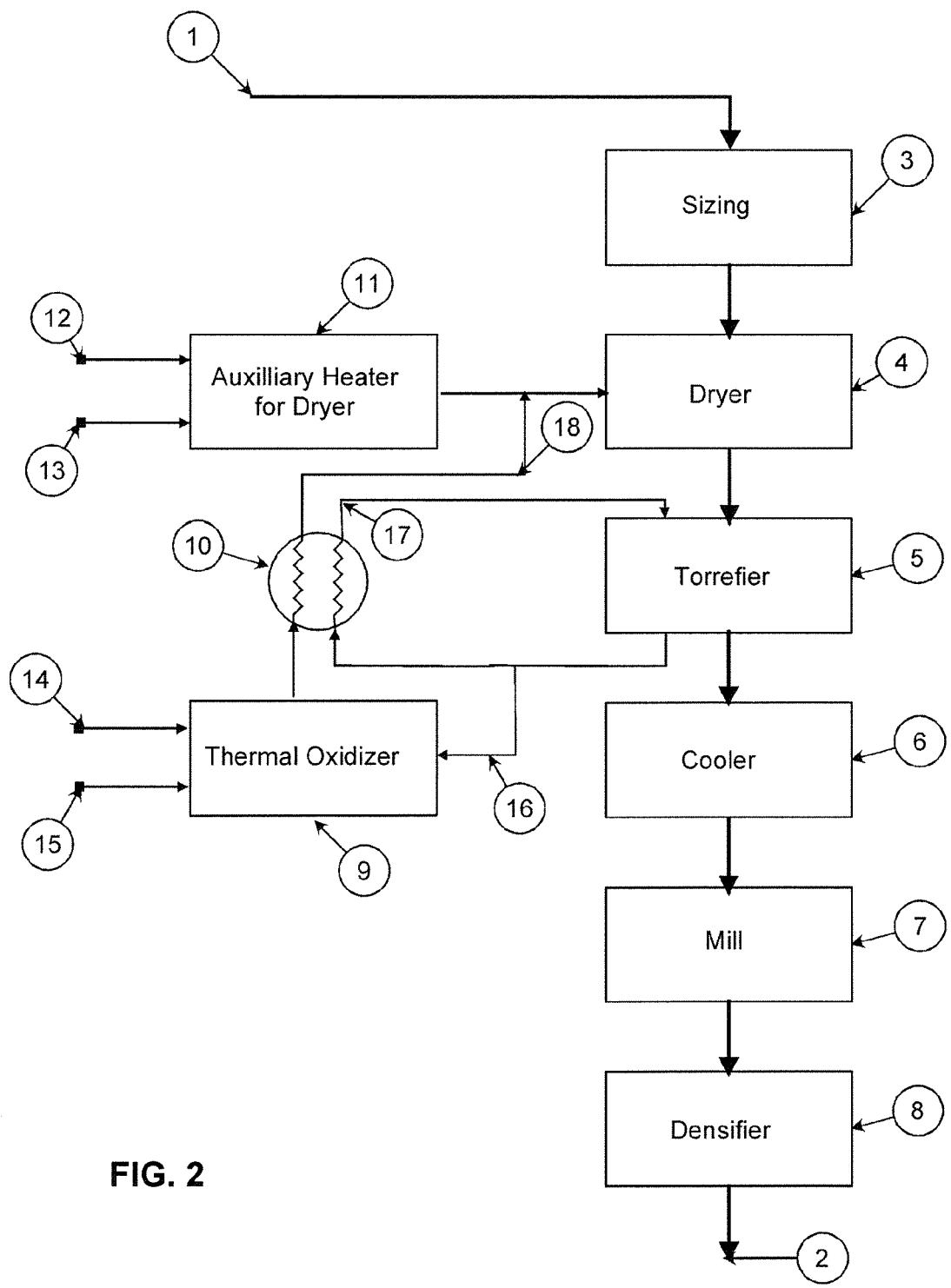
FIG. 2 is a flow diagram illustrating process steps and associated components of a system for certain disclosed embodiments of the present invention.

A functional block flow diagram of the overall process is shown in FIG. 2. The biomass feed (1) is first converted to a specified size in a conventional grinder (3). The raw biomass may have individual pieces up to 75 mm in diameter and 300 mm or more in length. The grinder reduces this size to a maximum of 13 mm×75 mm. Any conventional grinder may be used, such as a horizontal tub grinder commonly used in the forest products industry. The size control operation may be physically remote from the remainder of the process, such as in the harvest field.

The sized biomass, containing up to about 50% moisture, is then dried in a continuous direct air heated dryer (4). This dryer may be of the bulk flow type or any dryer suitably configured for this service. The dryer (4) delivers a product having a controlled residual moisture content of 25 wt % or less based on total weight of the biomass, and advantageously the residual moisture content is from about 12 wt % to about 25 wt %. The heated air for the dryer is a combination of hot combustion gases from an auxiliary heater (11) combined with cooled combustion gases (18) from the thermal oxidizer (9) associated with the torrefaction reactor (5). Fuel (13) combined with combustion air (12) in the auxiliary heater (11) provides the balance of thermal energy for operating the dryer (4). The dryer (4) delivers a product having a controlled residual moisture content of 25 wt % or less to the torrefier (5).

From the dryer (4) the biomass having 25% or less moisture content and with a size of from about 13 mm to about −75 mm in the longest dimension is fed to the bulk flow torrefier (5). Based on the particle size of the pre-sized biomass feed the vertical angle of all non-vertical surfaces (A, B) have been previously determined by a series of tests conducted on representative samples of the biomass. In the case of Eastern Oregon Juniper, for example, the maximum angle (A) in FIG. 1 would be 16°. The biomass enters the torrefier (5) at the top via a rotary air lock or similar atmosphere control device (25). Such rotary air lock or atmospheric control device is required to prevent ingress of oxygen into the reactor as torrefaction of biomass occurs at elevated temperatures in the substantial absence of oxygen. The torrefier is of the mass or bulk flow configuration (FIGS. 1, 3). That is, it has a cylindrical (FIG. 1) or rectangular (FIG. 3) body with a diameter or diagonal (D) and height (reaction zone) sized to provide the required residence time for the reaction. The volume of the reaction zone of the vessel allows the biomass to be heated to the torrefaction temperature of from 240° C. to 280° C. Controlling charging and discharging rates provides a residence time at the maximum temperature of from about 5 minutes to about 15 minutes. Exposure to temperatures greater than this promotes pyrolysis of the biomass and detracts from its calorific value as torrefied biomass. If the residency time is too short the raw biomass does not undergo full conversion to a torrefied biomass.

The hot gases enter the torrefier through air inlet tuyers (19) located at the junction of the straight sides of the reactor (20) and the elongated cone shaped lower section (22). The location of the hot gas inlet is at a point where the stress on the mass charge is greatest. An internal flow splitter (23) having sloped sides with angles equal to the slope of the walls further increases the stress in the particulate solids mass. At that point there is the least tendency for the charge to become fluidized and this location promotes the greatest and most even distribution of the hot gases throughout the downward moving mass. The hot gases entering at a temperature of about 300° C. move upward through the downward moving mass. The decomposition of the biomass and removal of the last amount of moisture and torrefaction reaction gases occurs as the hot gases move upward. This method permits the maximum temperature of the torrefied biomass to be limited by modulating the temperature of the torrefying gases circulated through the bulk flow reactor.

The reaction gases exit the top of the torrefier (27) and flow through an external heat exchanger (10) where the gases are reheated by combustion gases from a thermal oxidizer (9). A portion of the reaction gases, which represents the residual moisture and the released decomposition gases (16), flow to the thermal oxidizer (9) where, combined with metered air (14) and if necessary auxiliary fuel (15), are combusted. After re-heating the circulating torrefier gases (17) in heat exchanger (10) the cooled combustion gases (18) flow to the dryer (4) to augment the heat required there.

Below the gas inlet tuyers (19) of the torrefier (5), the torrefied biomass is cooled by contact with a jacketed section (26) of the torrefier (5). The coolant in this area may be water or a heat transfer fluid. The temperature of the coolant is maintained above the dew point of the hot gases in the torrefier, generally above about 80° C. The downward moving mass is therefore cooled to below 150° C., its auto-ignition temperature in air.

The cooled torrefied biomass is discharged from the lower conical section of the torrefier via an opening (26) to a rotary air lock, or preferably a graduated pitch screw conveyor. The discharge opening (24) is an elongated slot whose smallest dimension having been previous determined by a series of tests using the typical process biomass. For Eastern Oregon Juniper shredded and sized to 13 mm×75 mm as the longest dimension, the minimum dimension of the elongated discharge opening to provide for a bulk flow condition is 200 mm. The torrefied biomass as discharged may still have a temperature significantly greater than the ambient air temperature; accordingly, it is desirable to manage this temperature by advantageously subjecting it to a cooling step to mitigate any risk of spontaneous combustion on exposure to ambient air.

This method permits the properties of the torrefied biomass to be controlled by modulating the rate of withdrawal of the torrefied biomass from the bulk flow torrefier. A useful discharge means is a screw conveyor in which the flights of the conveyor increase in the direction of the discharge flow in order to facilitate bulk flow from the reactor.

The cooled torrefied product from the reactor (5) is optionally milled (7) to a smaller size suitable for densification (8) to yield the final, torrefied, high density fuel (2).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for torrefaction of particulate biomass, comprising:
    a mass flow reactor-configured as a vertically disposed cylindrical or rectangular vessel comprising an upper straight walled section that defines a reaction chamber and a lower tapered bottom section having an angle from vertical of less than 25°;
    a heated gas input that introduces heated gas around a perimeter of the reactor, the heated gas input positioned at a junction located between of the tapered bottom section and the upper straight-walled section;
    a gas discharge output;
    a particulate solids inlet; and
    a particulate solids discharge.

2. The system of claim 1 where the particulate solids discharge comprises an opening, located at the base of the tapered bottom section, and having a dimension of at least 200 mm in a shortest cross-section direction.

3. The system of claim 1 wherein the gas discharge output is a perforated collection duct located within the reaction chamber of the upper straight walled section and positioned centrally to the vertical axis of the reaction chamber.

4. The system of claim 1 where the heated gases are introduced by an injection device.

5. The system of claim 1 further comprising a discharge regulating device located externally to the particulate discharge and wherein the device comprises a conveyor or airlock.

6. The system of claim 5 wherein the reactor is further equipped with a temperature sensor able to determine temperature of the particulate biomass within the reaction chamber.

7. The system of claim 6 wherein the temperature sensor is in communication with the discharge regulating device via a controller which functions to control the speed, or rate of discharge, of the particulate biomass from the system.

8. A process for producing torrefied biomass by subjecting a raw particulate biomass to an elevated temperature sufficient to bring about torrefaction of the biomass, comprising:
providing a torrefaction mass flow reactor configured as a vertically disposed cylindrical or rectangular vessel comprising an upper straight walled section that defines a reaction chamber and a lower tapered bottom section having an angle from vertical of less than 25°, and further comprising a heated gas input that introduces heated gas around a perimeter of the reactor, the heated gas input positioned at a junction located between the tapered bottom section and the upper straight-walled section, a gas discharge output, a particulate solids inlet, and a particulate solids discharge; and
introducing particulate biomass into the torrefaction reactor to produce torrefied biomass.

9. The process of claim 8 wherein the raw particulate biomass prior to introduction into the torrefaction reactor has been treated to provide a residual moisture content of 25% or less, by total weight of the biomass.

10. The process of claim 9 wherein the residual moisture content is from 12 to 25 weight percent.

11. The process of claim 8 wherein the raw particulate biomass has a particle size of from 10 to 70 mm, in its largest dimension.

12. The process of claim 8 wherein torrefaction of the particulate biomass comprises subjecting the biomass, within the reactor, to a temperature of from 240° C. to 280° C. for a period of from 5 to 15 minutes.

13. The process of claim 8 wherein the torrefaction at elevated temperature is conducted in substantial absence of oxygen.

14. The process of claim 12 which, after torrefaction of the particulate biomass, further comprises a cooling step to render torrefied biomass immune to spontaneous combustion on exposure to ambient air.

* * * * *